April 16, 1957 L. GRASSI 2,788,903
SPACING AND ALIGNING DEVICE FOR SEEDLINGS
Filed June 15, 1951
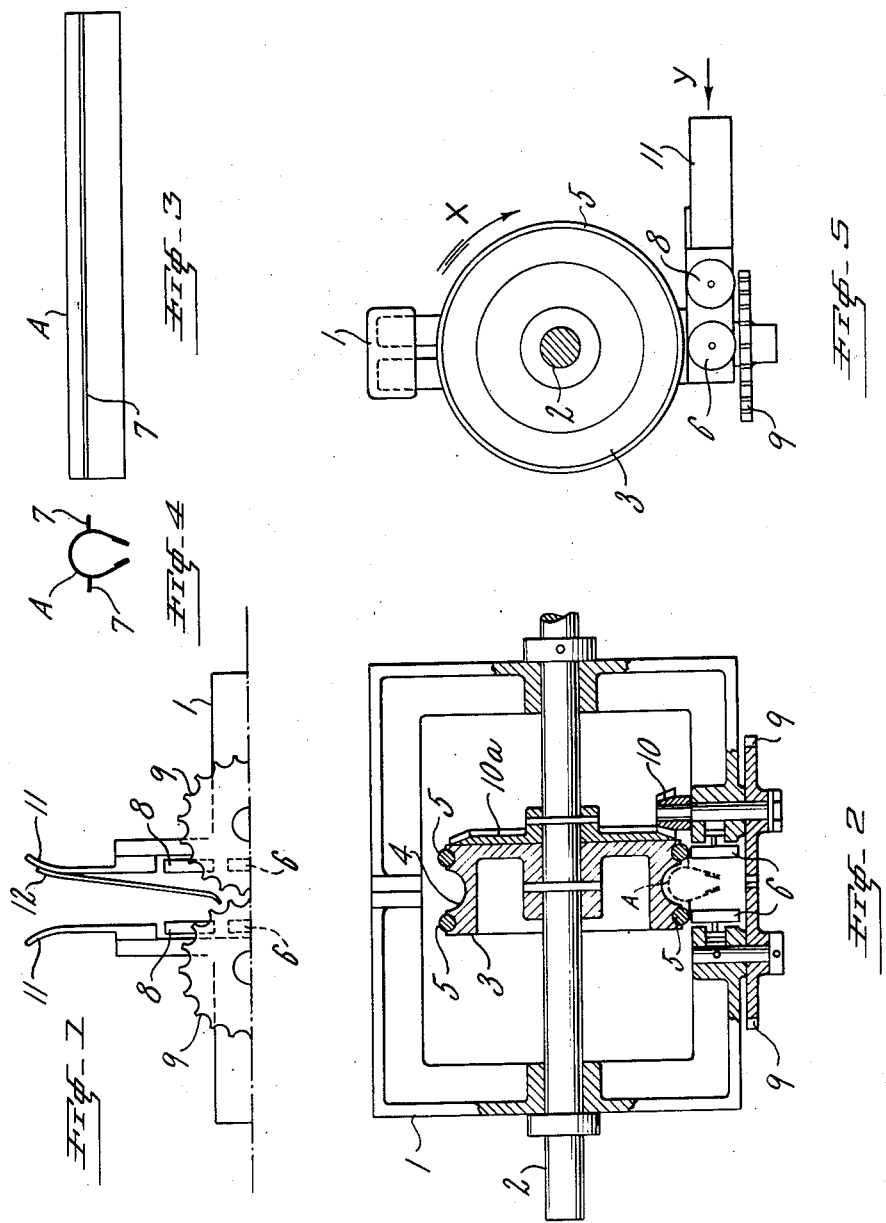
INVENTOR.
LUIGI GRASSI

United States Patent Office 2,788,903
Patented Apr. 16, 1957

2,788,903

SPACING AND ALIGNING DEVICE FOR SEEDLINGS

Luigi Grassi, Albuzzano, Italy

Application June 15, 1951, Serial No. 231,720

Claims priority, application Italy June 19, 1950

7 Claims. (Cl. 214—10.5)

This invention relates to a device for the spacing and aligning of seedlings in a magazine for subsequent charging and feeding of transplanting machines.

A well known fact is that, when the seedlings in general—and rice seedlings in particular—after having been picked and cleaned from mud, are heaped or collected in the charging hopper, their roots after a very short time get again entangled with one another, whereby the farmer cannot separate the seedlings even by using mechanical means.

The instant device is designed for the automatic spacing and aligning of seedlings in a magazine which seedlings may subsequently be charged to a conventional transplanting machine for setting. Magazines for such conventional transplanting machines have been known but it has heretofore been necessary to load the seedlings into the magazine carefully by hand to ensure proper spacing thereof. This obviously required considerable time.

The present invention permits the seedlings to be inserted rapidly into the magazines, without regard to their spacing in the magazines. By introduction of the magazines into the device hereinafter more fully disclosed, the spacing is automatically effected. Moreover, the spacing may be varied at will by changing the relative speeds of the parts of the device. The material leaving the device is a magazine loaded with seedlings spaced evenly at predetermined distances from each other. These magazines permit ready storing and transporting of the seedlings either before or after spacing. This concept of automatically spacing seedlings in the magazine was heretofore unknown.

The device according to this invention comprises at least one charging support, consisting of a magazine designed to keep the seedlings aligned, associated with means for feeding the magazine, and for spacing and transporting said seedlings toward any device by which they are set into the ground. The device according to the invention is diagrammatically shown, only by way of example, in the accompanying drawing, wherein:

Fig. 1 is a view of the device, seen from below.

Fig. 2 is a front elevation, partly in section, of same device.

Figs. 3 and 4, respectively, show a front and a side elevation of a magazine.

Fig. 5 is a side elevation of the device.

The picked seedlings are arranged in the magazines A, made of sheet metal or the like (see Figs. 3 and 4), which magazines are each of substantially circular-shaped cross-section, with spaced edges which form a channel, whereby the farmers charged with the picking of seedlings, are in position to charge these seedlings directly into the magazine, with the roots within the channel, and the stalks projecting through the interspace left between the spaced edges. These seedlings are slightly pressed against one another. Thus, the seedlings are kept well compressed within the magazine A, and project out of it with the whole length of their stalks. This operation requires a time nearly equal to that necessary for the preparation of a small sheaf of seedlings, as it is done with the already known transplanting systems.

The feeding device comprises a rigid frame 1, which supports a shaft 2 whereon a drum 3 is keyed. Drum 3 has a peripheral groove 4, which conforms to the contour of magazine A. Two rings 5, made of a resilient material, are arranged on each side of groove 4 and each co-operates with a loose or idler roller 6 having an axis parallel to that of shaft 2. The two opposed driving wings 7, with which the feed loaded magazines A are provided, are inserted between rings 5 and rollers 6. When the drum 3 is turned in the direction of arrow X, the magazine A will be driven along its longitudinal axis, in the direction shown by the arrow Y, as a result of the friction between wings 7, rollers 6 and rings 5. A further pair of supporting loose or idler rollers 8 are arranged in front of rollers 6. The seedlings are suitably spaced from one another—while the magazine is moved forward—by two toothed discs or gears 9, revolving in opposite directions around an axis normal to that of shaft 2, and having teeth which come successively into contact with the seedling stalks projecting out of magazine A. Spacing of the seedlings is obtained as effect of a lag in the magazine speed, with respect to peripheral speed of gears 9. Thus the seedlings, due to higher speed of gears 9, after having been gripped between the teeth thereof, are conveniently spaced each from the other and are then passed to any transplanting device, by which they are set into the ground with the required spacing. Obviously, by conveniently adjusting the R. P. M. of gears 9 which respect to speed of shaft 2, the spacing of seedlings can be varied at will.

The magazines A are inserted one after the other into the feeding device; empty magazines are thereafter dropped into a collecting container.

In the drawing, the right gear 9 (see Fig. 2) is driven by shaft 2 through a gearing-up pair of bevel gears 10, 10a. To diverging side guides 11 serve as leading sections for the insertion of magazines A, while the introduction of seedlings into the device is controlled by the leaf spring 12.

While the invention has been described with some detail, it is to be understood that the description is for the purpose of illustration only, and is not definitive of the limits of the inventive idea. The right is reversed to make such changes in the detail of construction and arrangement of parts, as will fall within the purview of the attached claims.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A transporting, feeding and spacing device for seedlings having stalk and root portions comprising a supporting frame, magazine means for holding said seedlings in aligned relation and adapted for feeding into said frame, transporting and feeding means on said frame for displacing said magazine means, and spacing means on said frame cooperating with said transporting and feeding means for positioning said seedlings at spaced intervals with respect to said magazine means, whereby upon feeding of said magazine means into said frame and transport therethrough said magazine means issues therefrom with said seedlings properly spaced.

2. A device as set forth in claim 1, including driving means for simultaneously actuating said transporting and feeding means and said spacing means at different speeds.

3. A device as set forth in claim 1, wherein said spacing means comprises a pair of toothed gears rotating in opposite directions and engaging said seedlings, whereby said seedlings are gripped between the teeth of said toothed gears and longitudinally displaced within said magazine means.

4. A device for automatic spacing and alignment of seedlings having stalk and root portions, comprising a supporting frame, driving shaft means supported by said frame, drum means keyed to said shaft means for rotation therewith, roller means engaging said drum means and rotated thereby, toothed gear means being axially disposed perpendicularly with respect to said roller means, and magazine means for said seedlings and cooperable with said drum means and said roller means, whereby upon insertion of said magazine means laden with seedlings between said drum means and said roller means advancing of said magazine means through said frame is effected, said toothed gear means gripping said seedlings and displacing same for longitudinal spacing and alignment within said magazine means.

5. A device according to claim 4, wherein said toothed gear means includes a pair of toothed gears rotated in opposite directions upon actuation of said driving shaft means.

6. A device according to claim 5, including means for varying the peripheral speed of said toothed gears relative to the speed of said driving shaft means, whereby the spacing of seedlings in said magazine means may be varied.

7. A device according to claim 6, said magazine means comprising a tube provided with a slot extending longitudinally thereof, and guide means projecting outwardly from said tube, whereby upon insertion of said magazine means into said frame said tube contacts said drum means, said guide means cooperating with said roller means.

References Cited in the file of this patent

UNITED STATES PATENTS

| | | |
|---|---|---|
| 648,260 | Holum | Apr. 24, 1900 |
| 1,106,405 | Poucher et al. | Aug. 11, 1914 |
| 1,613,447 | Ellberg | Jan. 4, 1927 |
| 1,848,865 | Bacle | Mar. 8, 1932 |
| 2,199,935 | Johns | May 7, 1940 |
| 2,514,522 | Shelton | July 11, 1950 |

FOREIGN PATENTS

| | | |
|---|---|---|
| 112,442 | Austria | Mar. 11, 1929 |
| 290,399 | Italy | Nov. 17, 1931 |
| 581,912 | Germany | Aug. 3, 1933 |